US011030609B2

(12) United States Patent
Chauvin et al.

(10) Patent No.: US 11,030,609 B2
(45) Date of Patent: Jun. 8, 2021

(54) PREVENTING DUPLICATE WIRELESS TRANSACTIONS

(71) Applicant: Apple Inc., Cupertino, CA (US)

(72) Inventors: Vincent Chauvin, San Francisco, CA (US); Jordi Agud Ruiz, Tokyo (JP); Kenyu Abe, Tokyo (JP); Seunghoi Kim, Tokyo (JP); Tatsuya Nagae, Tokyo (JP); Vusthla Sunil Reddy, Cupertino, CA (US); Peter Agboh, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 361 days.

(21) Appl. No.: 15/880,444

(22) Filed: Jan. 25, 2018

(65) Prior Publication Data

US 2018/0240097 A1    Aug. 23, 2018

Related U.S. Application Data

(60) Provisional application No. 62/460,712, filed on Feb. 17, 2017.

(51) Int. Cl.
*G06Q 40/00* (2012.01)
*G06Q 20/32* (2012.01)
(Continued)

(52) U.S. Cl.
CPC ....... *G06Q 20/325* (2013.01); *G06Q 20/3227* (2013.01); *G06Q 20/3278* (2013.01); *G06Q 20/405* (2013.01); *H04B 17/318* (2015.01)

(58) Field of Classification Search
CPC ............. G06Q 20/325; G06Q 20/3227; G06Q 20/3278; G06Q 20/405; H04B 17/318
See application file for complete search history.

(56) References Cited

U.S. PATENT DOCUMENTS 9,020,848 B1 *  4/2015  Ridge .................. G06Q 40/125
                                                                705/32
9,286,639 B1 *  3/2016  Patzer .................... G06Q 40/10
(Continued)

FOREIGN PATENT DOCUMENTS

JP    2010-250694    11/2010
JP    2016-110605    6/2016
(Continued)

OTHER PUBLICATIONS

S. B. Abdinagoro and M. Hamsal, "E-payment in integrated public transport modes: Case study of public transports in Greater Jakarta," 2016 International Conference on Information Management and Technology (ICIMTech), Bandung, 2016, pp. 261-266, doi: 10.1109/ICIMTech.2016.7930341. (Year: 2016).*

(Continued)

*Primary Examiner* — Rajesh Khattar
(74) *Attorney, Agent, or Firm* — Morgan, Lewis & Bockius LLP

(57) ABSTRACT

A device implementing a system for preventing duplicate wireless transactions includes a wireless communication controller that is configured to receive a signal for conducting a wireless transaction with a wireless transaction terminal. The wireless communication controller is further configured to determine whether a transaction type of the wireless transaction is associated with a signal strength threshold. The wireless communication controller is further configured to measure a signal strength associated with the wireless transaction upon determining that the transaction type of the wireless transaction is associated with the signal strength threshold. The wireless communication controller is further configured to prevent the wireless transaction from completing when the transaction type of the wireless transaction is associated with the signal strength threshold and the measured signal strength fails to satisfy the signal (Continued)

strength threshold, otherwise allow the wireless transaction to complete.

20 Claims, 11 Drawing Sheets

(51) Int. Cl.
*H04B 17/318* (2015.01)
*G06Q 20/40* (2012.01)

(56) References Cited

U.S. PATENT DOCUMENTS

| | | | | |
|---|---|---|---|---|
| 9,842,330 | B1* | 12/2017 | Van Os | G06Q 20/4014 |
| 9,948,412 | B2* | 4/2018 | Critchfield | H04B 17/23 |
| 10,447,790 | B2* | 10/2019 | Wang | H04L 67/26 |
| 2006/0095957 | A1* | 5/2006 | Lundblade | H04L 9/32 |
| | | | | 726/5 |
| 2007/0276765 | A1* | 11/2007 | Hazel | G06F 21/72 |
| | | | | 705/71 |
| 2008/0298573 | A1* | 12/2008 | Monk | G06Q 10/067 |
| | | | | 379/189 |
| 2009/0143104 | A1* | 6/2009 | Loh | G06Q 20/40145 |
| | | | | 455/558 |
| 2012/0172089 | A1* | 7/2012 | Bae | H04W 12/06 |
| | | | | 455/558 |
| 2012/0323783 | A1* | 12/2012 | Canetto | G06Q 30/06 |
| | | | | 705/44 |
| 2013/0102246 | A1* | 4/2013 | Gagne | H04M 1/7253 |
| | | | | 455/41.1 |
| 2015/0127549 | A1* | 5/2015 | Khan | G06Q 20/3278 |
| | | | | 705/71 |
| 2015/0127550 | A1* | 5/2015 | Khan | G06Q 20/382 |
| | | | | 705/71 |
| 2015/0142644 | A1* | 5/2015 | Vaid | G06Q 20/02 |
| | | | | 705/39 |
| 2015/0186887 | A1* | 7/2015 | Khan | G06Q 20/223 |
| | | | | 705/71 |
| 2015/0206136 | A1* | 7/2015 | Maddocks | G06Q 20/3672 |
| | | | | 705/71 |
| 2015/0278803 | A1 | 10/2015 | Champaneria et al. | |
| 2015/0348000 | A1* | 12/2015 | Khan | G06Q 20/322 |
| | | | | 705/41 |
| 2016/0063490 | A1* | 3/2016 | Ziat | G06Q 20/223 |
| | | | | 705/71 |
| 2016/0232516 | A1* | 8/2016 | Dayan | G06Q 20/4016 |
| 2016/0286391 | A1* | 9/2016 | Khan | G06Q 20/382 |
| 2017/0103396 | A1* | 4/2017 | Smets | G06Q 20/40 |
| 2018/0068301 | A1* | 3/2018 | Abdulrahiman | G06Q 20/401 |
| 2018/0082293 | A1* | 3/2018 | Lin | G06Q 20/085 |
| 2018/0122002 | A1* | 5/2018 | Kelly | G06Q 40/025 |
| 2019/0303945 | A1* | 10/2019 | Mitra | G06Q 20/3572 |
| 2020/0034830 | A1* | 1/2020 | Ortiz | G06Q 20/227 |

FOREIGN PATENT DOCUMENTS

| | | |
|---|---|---|
| JP | 2018-022934 | 2/2018 |
| WO | WO 2015/159307 | 10/2015 |

OTHER PUBLICATIONS

Japanese Office Action from Japanese Patent Application No. 2018-025621, dated Mar. 4, 2019, 7 pages including English language translation.

* cited by examiner

PREVENTING DUPLICATE WIRELESS TRANSACTIONS

CROSS-REFERENCE TO RELATED APPLICATIONS

The present application claims the benefit of U.S. Provisional Patent Application Ser. No. 62/460,712, entitled "Preventing Duplicate Wireless Transactions," filed on Feb. 17, 2017, which is hereby incorporated by reference in its entirety for all purposes.

TECHNICAL FIELD

The present description relates generally to a wireless or contactless transaction system, including to preventing duplicate wireless transactions in a wireless transaction system.

BACKGROUND

In a wireless transaction system, passive devices, such as near-field communication (NFC) cards, may be used to conduct wireless transactions with wireless transaction terminals, such as NFC readers. The passive devices may not include power sources and instead may be powered by currents induced by the signals transmitted by the wireless transaction terminals. Thus, the range for conducting a wireless transaction with a passive device may be physically limited in that the signals received by the passive device from the wireless transaction terminal need to have adequate signal strength to induce sufficient current to power the passive device.

Active devices, such as phones, smart watches, etc., may also be used to conduct wireless payment transactions with wireless transaction terminals, such as by implementing card emulation. For example, one or more stored value payment applets that correspond to a stored value card (or "truth on card" or "actual cash value" (ACV) card), such as a transit card or other such prepaid card, may be provisioned on a secure element of an electronic device and used to conduct wireless transactions with a wireless transaction terminal. However, since active devices include power sources, active devices may not have the same range constraints as passive devices with respect to conducting wireless transactions with wireless transaction terminals.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
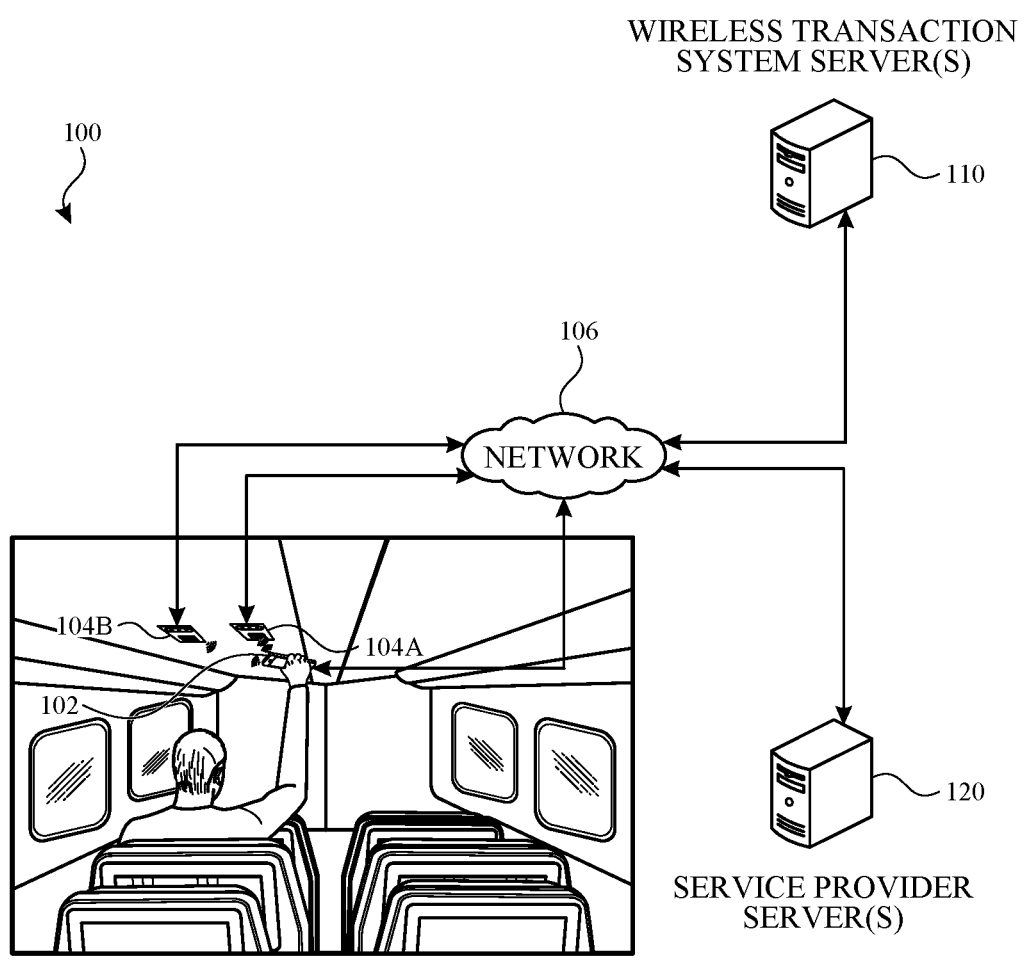
FIG. 1 illustrates an example network environment in which a system for preventing duplicate wireless transactions may be implemented in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

In wireless transaction systems, such as those originally designed for passive devices, wireless transaction terminals may be physically positioned in close proximity to each other, e.g., due to the aforementioned range constraints of passive devices, such that regardless of the position of a passive device only a single wireless transaction terminal will be in range of conducting a wireless transaction with the passive device at any given time. However, since active devices do not have the same range constraints as passive devices, the close proximity of the wireless transaction terminals to one another may result in an active device being within range of conducting a wireless transaction with multiple wireless transaction terminals at the same time, which may result in the active device completing the same wireless transaction with multiple wireless transaction terminals.

The subject system provides a solution to these and other issues by selectively implementing a signal strength threshold on active devices conducting wireless transactions with particular wireless transaction terminals, such as wireless transaction terminals that are positioned in close proximity to each other. For example, when a signal strength threshold is implemented for a given wireless transaction, if the measured signal (or field) strength of a signal associated with the wireless transaction does not satisfy (e.g., exceed) the signal strength threshold, the subject system prevents the wireless transaction from completing. Alternatively, when the signal strength threshold is not implemented for the wireless transaction, or when the signal strength threshold is implemented for the wireless transaction and the measured signal strength satisfies the signal strength threshold, the subject system allows the wireless transaction to complete.

The signal strength threshold may be set to emulate the effective signal strength threshold of passive devices that communicate with the particular wireless transaction terminals, e.g., the minimum signal strength required to power and communicate with the passive devices. In this manner, the active devices will not complete wireless transactions with wireless transaction terminals that would be outside of the range of the passive devices, which thereby prevents the active devices from completing the same wireless transaction with multiple different wireless transaction terminals. In one or more implementations, the signal strength threshold may be selectively enabled and/or configured for different wireless transaction terminals, e.g. based on the distance between the wireless transaction terminals, and/or based on the minimum signal strength required to power and communicate with the passive devices associated with the wireless transaction terminals.

FIG. 1 illustrates an example network environment 100 in which a system for preventing duplicate wireless transactions may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 102, one or more wireless transaction terminals 104A-B, a network 106, one or more wireless transaction system servers 110, and one or more service provider servers 120.

The network 106 may communicatively couple, for example, one or more of the wireless transaction terminals 104A-B to the one or more service provider servers 120 and/or the one or more wireless transaction system servers 110, the electronic device 102 to the one or more wireless transaction system servers 110 and/or the one or more service provider servers 120, and the one or more wireless transaction system servers 110 to the one or more service provider servers 120. The electronic device 102 may communicate with one or more of the wireless transaction terminals 104A-B via a direct communication, such as a near field communication (NFC), that bypasses the network 106. The electronic device 102 may communicate with one or more of the wireless transaction terminals 104A-B over the network 106 and/or one or more of the wireless transaction terminals 104A-B may not be communicatively coupled to the network 106. In one or more implementations, the network 106 may be an interconnected network of devices that may include, or may be communicatively coupled to, the Internet.

The wireless transaction terminals 104A-B may be, for example, wireless transit terminals, wireless toll terminals, wireless parking meter terminals, wireless point of sale terminals, wireless payment terminals, and/or any devices that include one or more wireless interfaces that may be used to perform a wireless transaction, such as NFC radios, wireless local area network (WLAN) radios, Bluetooth radios, Zigbee radios, cellular radios, and/or other wireless radios. In FIG. 1, by way of example, the wireless transaction terminals 104A-B are depicted as wireless transit terminals, such as on a train or a bus. In one or more implementations, one or more of the wireless transaction terminals 104A-B may be a distributed wireless transaction terminal that includes multiple individual antennas that are communicatively coupled to a switch and a single transceiver. An example distributed wireless transaction terminal is discussed further below with respect to FIG. 10. One or more of the wireless transaction terminals 104A-B may be, and/or may include all or part of, the electronic system discussed below with respect to FIG. 11.

In one or more implementations, the wireless transaction terminals 104A-B may be positioned in close proximity to one another such that an electronic device 102 that is positioned proximate to the wireless transaction terminal 104A may also receive signals from the other wireless transaction terminal 104B. However, the signals from the wireless transaction terminal 104B may not be strong enough to provide power to a passive device that is positioned proximate to the wireless transaction terminal 104A. Example timing diagrams illustrating the reception of signals from both of the wireless terminals 104A-B by the electronic device 102 are discussed further below with respect to FIGS. 8 and 9.

The one or more wireless transaction system servers 110 may include one or more servers that facilitate providing a wireless transaction system, such as a mobile payment system, to the electronic device 102. The wireless transaction system servers 110 may include one or more trusted services manager (TSM) servers, one or more broker servers, one or more application servers, and/or generally any servers that may facilitate providing a wireless transaction system. In one or more implementations, an authorized user of the electronic device 102 may have a user account with the wireless transaction system. The user account may be used to manage the various cards and/or credentials that the user has registered with the wireless transaction system, e.g., via the one or more wireless transaction system servers 110. The one or more wireless transaction system servers 110 may be, and/or may include all or part of, the electronic system discussed below with respect to FIG. 11. For explanatory purposes, the one or more wireless transaction system servers 110 are generally described herein with reference to a single wireless transaction system. However, the one or more wireless transaction system servers 110 may include servers corresponding to multiple different wireless transaction systems, such as multiple different mobile payment systems.

The one or more service provider servers 120 may include one or more server devices that may facilitate a service being provided, such as a transit service, and/or that may facilitate utilizing wireless transactions, such as wireless payment transactions, for the service being provided. In one or more implementations, the one or more service provider servers 120 may include one or more servers corresponding to one or more financial institutions. The one or more service provider servers 120 may include one or more TSM servers, one or more broker servers, one or more application servers, or generally any servers that may facilitate providing a service and/or utilizing wireless payment transactions for the service. In one or more implementations, an authorized user of the electronic device 102 may have a user account with one or more service providers associated with the one or more service provider servers 120. The one or more service provider servers 120 may be, and/or may include all or part of, the electronic system discussed below with respect to FIG. 11. For explanatory purposes, the one or more service provider servers 120 are generally described herein with reference to a single transit system. However, the one or more service provider servers 120 may include servers corresponding to multiple different services, such as multiple different transit systems and/or other services.

The electronic device 102 may be, for example, a portable computing device such as a laptop computer, a smartphone, a peripheral device (e.g., digital camera, headphones), a tablet device, a wearable device (e.g., watch, band, etc.), or other appropriate devices that include one or more wireless interfaces, such as one or more NFC radios, WLAN radios, Bluetooth radios, Zigbee radios, cellular radios, and/or other wireless radios. In FIG. 1, by way of example, the electronic device 102 is depicted as a mobile device.

In one or more implementations, the electronic device 102 may include a secure element onto which one or more payment applets, including stored value payment applets, may be provisioned. An example electronic device that includes a secure element is discussed further below with respect to FIG. 2, and an example secure element is discussed further below with respect to FIG. 3. The electronic device 102 may be, and/or may include all or part of, the electronic system discussed below with respect to FIG. 11.

In order to have a stored value payment applet for a given service provider provisioned onto a secure element of the electronic device 102, a user of the electronic device 102 may access a web site or app associated with the service provider, such as a web site provided by the one or more service provider servers 120, and/or the user may interact with a physical device associated with the service provider, such as a stored value card provisioning device, to request that a stored value payment applet for the service provider be provisioned onto the secure element of the electronic device 102. The user may provide a monetary payment to the service provider, such as a cash payment to a physical machine and/or an electronic payment via the web site or app. The monetary payment may correspond to the monetary value the user would like associated with the stored value payment applet being provisioned on the electronic device 102.

After completing the transaction with the service provider, the one or more of the service provider servers 120 and/or the one or more wireless transaction system servers 110, such as a TSM server and/or a broker server, may cause the stored value payment applet for the service provider to be provisioned on a secure element of the electronic device 102, such as by transmitting a provisioning script to be executed by the secure element of the electronic device 102. The secure element may execute the provisioning script and provision the stored value payment applet for the service provider on the secure element with the monetary value paid for by the user.

Once a stored value payment applet has been provisioned on the secure element of the electronic device 102 for a given service provider, the user may use the electronic device 102 for a wireless transaction, such as a wireless payment transaction with a wireless transaction terminal associated with the service provider, such as the wireless transaction terminal 104A. However, when in proximity to the wireless transaction terminal 104A, the electronic device 102 may also be sufficiently proximate to the wireless transaction terminal 104B to receive signals from the wireless transaction terminal 104B, e.g., depending upon the positioning of the wireless transaction terminals 104A-B relative to one another. Accordingly, in order to prevent a duplicate wireless transaction with the wireless transaction terminal 104B, the electronic device 102 may implement the signal threshold of the subject system to effectively limit the range of the electronic device 102 to the same range at which passive devices can communicate with the wireless transaction terminals 104A-B.

Since the positioning or spacing of the wireless transaction terminals 104A-B, as well as the minimum signal strength for communicating with passive devices, may differ across various wireless transaction systems, the electronic device 102 may implement the signal threshold of the subject system when the electronic device 102 determines that the wireless transaction being conducted is associated with, for example, wireless transaction terminals 104A-B that are located in close proximity. For example, the electronic device 102 may identify a transaction type, or other identifier of the wireless transaction that may be used to determine whether the signal threshold should be implemented for the wireless transaction. In one or more implementations, the electronic device 102 may store a lookup table that maps transaction types to an indicator of whether the signal threshold should be implemented for the wireless transaction and/or to a signal strength value to be used as the signal threshold for the wireless transaction. An example process of implementing the subject system by the electronic device 102 is discussed further below with respect to FIG. 4. Example process flows of the subject system with respect to the electronic device 102 and the wireless transaction terminal 104A are discussed further below with respect to FIGS. 5-7.

In one or more implementations, when the electronic device 102 is in close proximity to one of the wireless transaction terminals 104A-B, such as the wireless transaction terminal 104A, the electronic device 102 may detect one or more polling signals transmitted by the wireless transaction terminal 104A. The polling signals may be associated with a particular pattern, code, and/or signature (e.g., based on frequency of transmission, signal length, preamble length, etc.) that may be associated with a given wireless transaction terminal and/or service provider, such as in a given geographic region, e.g. continent, country, state, city, etc. Thus, the electronic device 102 may use the polling signals to identify the wireless transaction terminal 104A, determine the transaction types associated with the wireless transaction terminal 104A and, determine whether a signal strength threshold should be implemented for wireless transactions with the wireless transaction terminal 104A.

Figure 2:
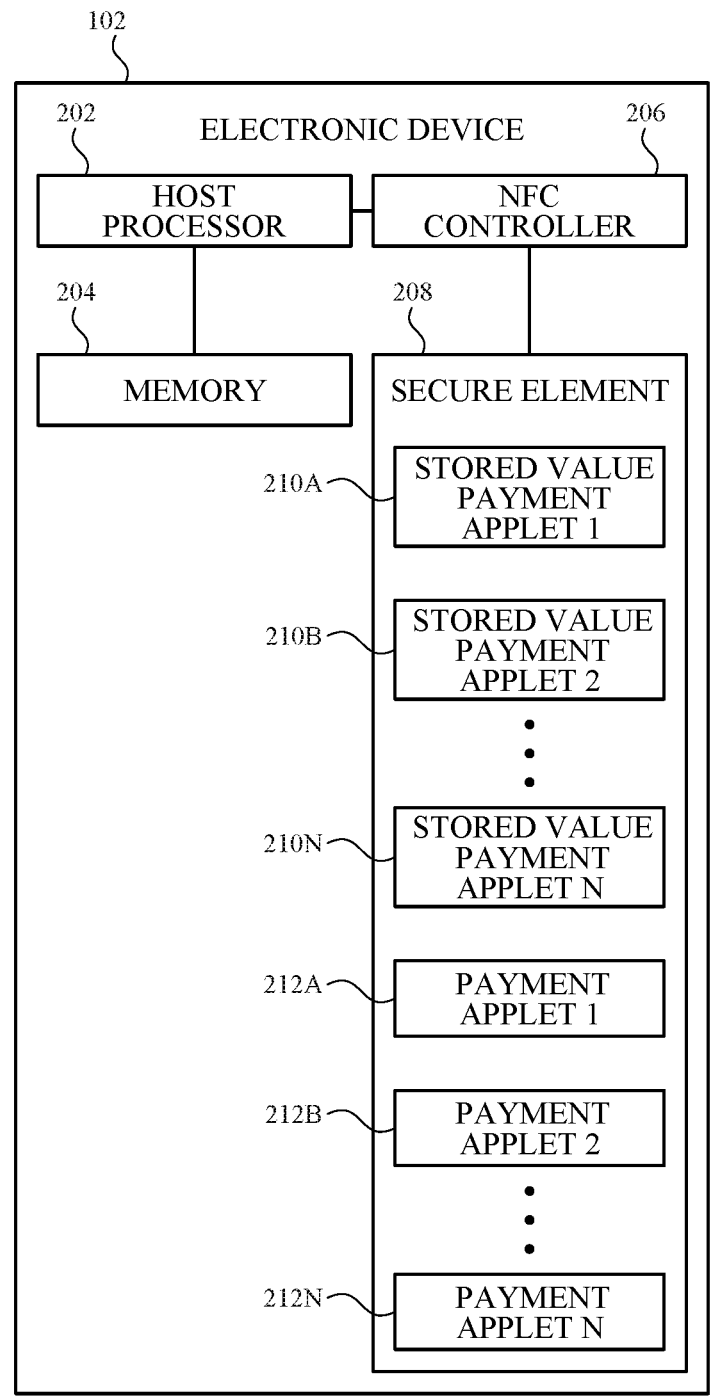
FIG. 2 illustrates an example electronic device that may be used in a system for preventing duplicate wireless transactions in accordance with one or more implementations.

FIG. 2 illustrates an example electronic device 102 that may be used in a system for preventing duplicate wireless transactions in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. In one or more implementations, one or more components of the example electronic device 102 may be implemented by one or more of the wireless transaction terminals 104A-B.

The electronic device 102 may include a host processor 202, a memory 204, an NFC controller 206, and a secure element 208. The secure element 208 may include one or more interfaces for communicatively coupling (directly or indirectly) to the NFC controller 206 and/or the host processor 202, such as via one or more single wire protocol (SWP) connections and/or any other data connection. The secure element 208 may include one or more provisioned stored value payment applets 210A-N and/or one or more provisioned non-stored value payment applets 212A-N, which may be referred to herein as payment applets 212A-N. In one or more implementations, the operating system and/or execution environment of the secure element 208 may be a JAVA-based operating system and/or JAVA-based execution environment, and the applets 210A-N, 212A-N may be JAVA-based applets. In other implementations, other operating systems, languages, and/or environments can be implemented. In addition to the one or more applets 210A-N, 212A-N, the secure element 208 may also include one or more additional applets for performing other operations, such as a security applet, a registry applet, and the like.

The applets 210A-N, 212A-N may be provisioned on the secure element 208 in part by, for example, a trusted services manager server and/or a broker server, such as of the wireless transaction system servers 110. For example, the trusted services manager server and/or the broker server may transmit a provisioning script to the electronic device 102 via the network 106. In some implementations, the host processor 202 of the electronic device 102 may receive the script and may provide the script to the secure element 208, such as via the NFC controller 206 and/or directly to the secure element 208. The secure element 208 may perform one or more security mechanisms to verify the received script, such as one or more security mechanisms inherent in the GlobalPlatform framework, and may then execute the received script.

The execution of the script by the secure element 208 may cause one or more of the applets 210A-N, 212A-N to be provisioned on the secure element 208. Each of the applets 210A-N, 212A-N may be provisioned with one or more of: an applet identifier, a device primary account number (DPAN) identifier, an identifier of the associated service provider, and/or one or more attributes. The applet identifier associated with a given payment applet 212A may be used by, for example, the host processor 202 and/or the trusted services manager server to uniquely identify the payment applet 212A relative to the other applets 210A-N, 212B-N provisioned on the secure element 208, such as to perform one or more operations with respect to the payment applet 212A. In one or more implementations, the applet identifiers may be used by the host processor 202 to store associations between the applets 210A-N, 212A-N and the corresponding service providers.

The DPAN identifier may be associated with an account, such as a credit card account, associated with a given payment applet 212A. In one or more implementations, since the stored value payment applets 210A-N locally store a monetary value, the stored value payment applets 210A-N may not be provisioned with a DPAN identifier and may use another identifier instead. When conducting a wireless payment transaction using one of the payment applets 212A-N, the secure element 208 may provide the DPAN identifier to a wireless transaction terminal 104A. The wireless transaction terminal 104A may then forward the DPAN identifier to the associated service provider who can determine the account associated with the DPAN identifier, and confirm that the account contains sufficient funds and/or credit to complete the wireless payment transaction. Thus, if the same wireless payment transaction is conducted with two different wireless transaction terminals 104A-B, funds may be deducted from the account of the user two times.

In one or more implementations, the applets 210A-N, 212A-N may also be provisioned with an attribute that indicates the type of communication protocol used by the applets 210A-N, 212A-N to communicate with a wireless transaction terminal, such as the wireless transaction terminal 104A. The types of communication protocols may include, for example, an NFC-A protocol, an NFC-B protocol, an NFC-F protocol, a Bluetooth protocol, a Bluetooth low energy (BLE) protocol, a Zigbee protocol, a Wi-Fi protocol, or generally any communication protocol. The applets 210A-N, 212A-N may also be provisioned with an attribute that indicates whether a signal strength threshold should be implemented for wireless transactions that utilize the applets 210A-N, 212A-N, and/or an attribute that indicates a signal strength value that should be used for the signal strength threshold.

The NFC controller 206 may include one or more antennas and one or more transceivers for transmitting/receiving NFC communications. The NFC controller 206 may further include one or more interfaces, such as a single wire protocol interface, for coupling to the host processor 202 and/or the secure element 208. The NFC controller 206 may be able to communicate via one or more different NFC communication protocols, such as NFC-A (or Type A), NFC-B (or Type B), NFC-F (or Type F or FeliCa), and/or International Organization for Standardization (ISO)/International Electrotechnical Commission (IEC) 15693. The NFC-A protocol may be based on ISO/IEC 14443A and may use Miller bit coding with a 100 percent amplitude modulation. The NFC-B protocol may be based on ISO/IEC 14443B and may use variations of Manchester encoding along with a 10 percent modulation. The NFC-F protocol may be based on FeliCa JIS X6319-4 and may use a slightly different variation of Manchester coding than the NFC-B protocol.

For explanatory purposes, the electronic device 102 is illustrated in FIG. 2 as utilizing the NFC controller 206 to communicate with the wireless transaction terminal 104A. However, the electronic device 102 may use any wireless communication controller and/or protocol to communicate with the wireless transaction terminal 104A, such as Bluetooth, Bluetooth low energy, Wi-Fi, Zigbee, millimeter wave (mmWave), or generally any wireless communication controller and/or protocol.

The host processor 202 may include suitable logic, circuitry, and/or code that enable processing data and/or controlling operations of the electronic device 102. In this regard, the host processor 202 may be enabled to provide control signals to various other components of the electronic device 102. The host processor 202 may also control transfers of data between various portions of the electronic device 102. Additionally, the host processor 202 may enable implementation of an operating system or otherwise execute code to manage operations of the electronic device 102. The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, one or more of the host processor 202, the memory 204, the NFC controller 206, the secure element 208, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
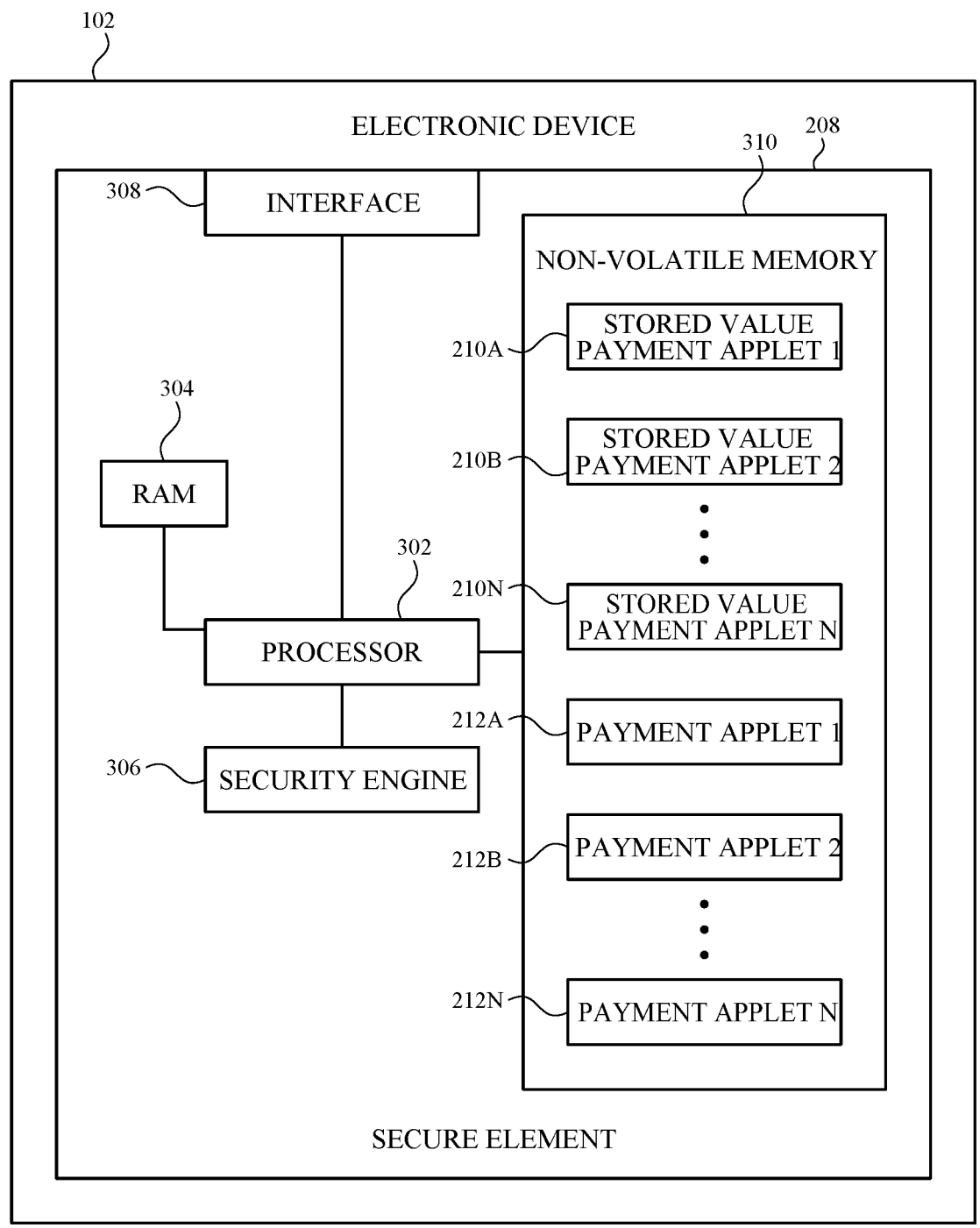
FIG. 3 illustrates an example electronic device including an example secure element that may be used in a system for preventing duplicate wireless transactions in accordance with one or more implementations.

FIG. 3 illustrates an example electronic device 102 including an example secure element 208 that may be used in a system for preventing duplicate wireless transactions in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The secure element 208 includes a secure processor 302, RAM 304, a security engine 306, an interface 308, and non-volatile memory 310. The RAM 304 may include one or more of static RAM (SRAM), and/or dynamic RAM (DRAM). The interface 308 may communicatively couple the security element 208 to one or more other chips in the device, such as the NFC controller 206 and/or the host processor 202. The interface 308 may be, for example, a SWP interface, a universal serial bus (USB) interface, or generally any data interface. The secure processor 302 may be, for example, a reduced instruction set computing (RISC) processor, an advanced RISC machine (ARM) processor, or generally any processing circuitry.

The security engine 306 may perform one or more security operations for the secure element 208. For example, the security engine 306 may perform cryptographic operations and/or may manage cryptographic keys and/or certificates. In one or more implementations, the communications between the secure element 208 and an external device, such as the wireless transaction terminal 104A and/or the trusted services manager server may be encrypted, and therefore the content of such communications may be inaccessible to the NFC controller 206. For example, for NFC-F communications, an encryption key may be dynamically generated each time mutual authentication is performed. In these one or more implementations, the encryption/decryption and/or key generation/management may be performed all or in part by the security engine 306.

The non-volatile memory 310 may be and/or may include, for example, flash memory. The non-volatile memory 310 may store the attributes and executable code associated with the applets 210A-N, 212A-N. In one or more implementations, the non-volatile memory 310 may also store firmware and/or operating system executable code that is executed by the secure processor 302 to provide the execution environment for the applets 210A-N, 212A-N, such as a JAVA execution environment.

In one or more implementations, one or more of the secure processor 302, the RAM 304, the security engine 306, the interface 308, the non-volatile memory 310, and/or one or more portions thereof, may be implemented in software (e.g., subroutines and code), may be implemented in hardware (e.g., an ASIC, an FPGA, a PLD, a controller, a state machine, gated logic, discrete hardware components, or any other suitable devices) and/or a combination of both.

Figure 4:
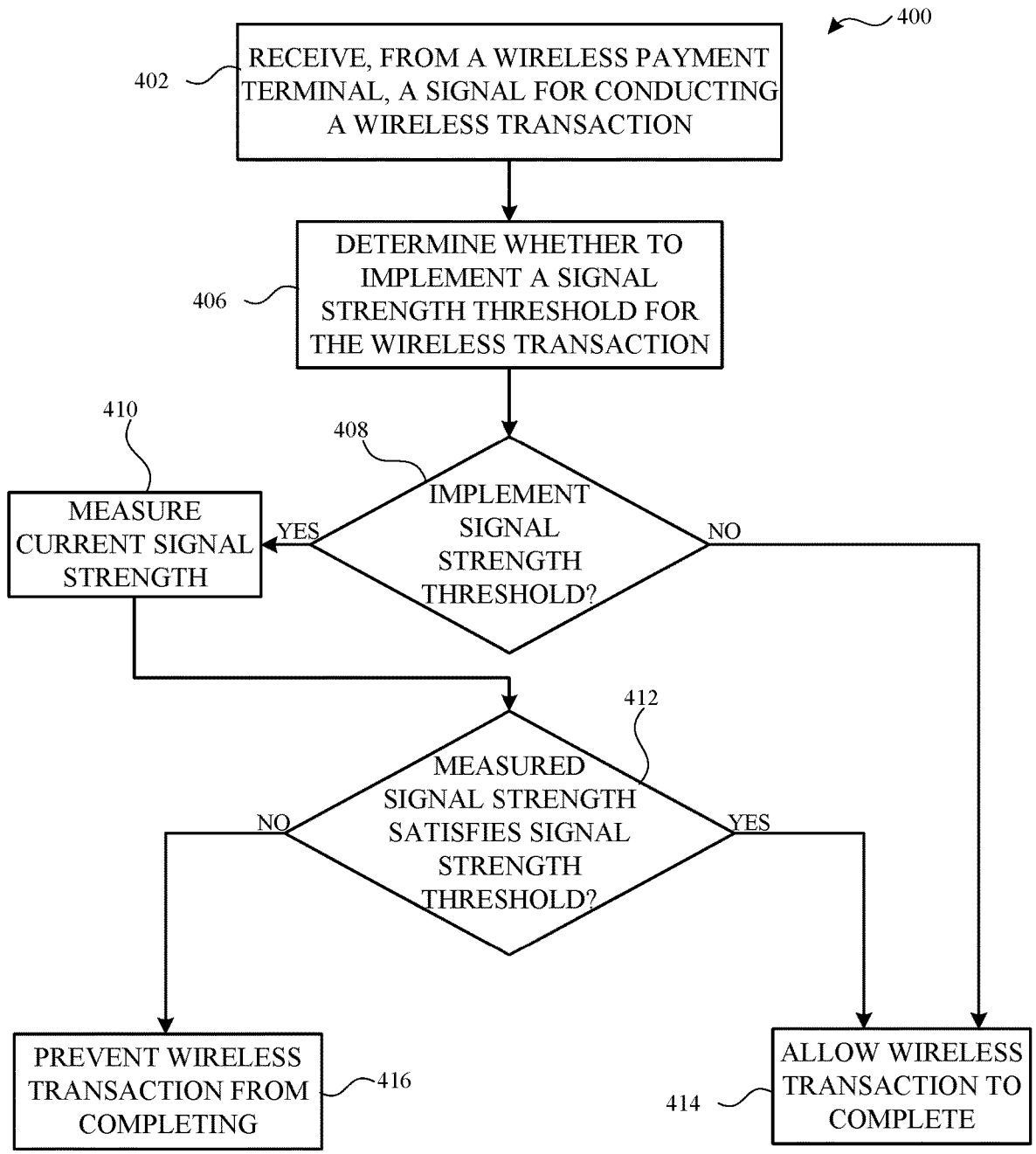
FIG. 4 illustrates a flow diagram of an example process for preventing duplicate wireless transactions in accordance with one or more implementations.

FIG. 4 illustrates a flow diagram of an example process 400 for preventing duplicate wireless transactions in accordance with one or more implementations. For explanatory purposes, the process 400 is primarily described herein with reference to the electronic device 102 and the wireless transaction terminal 104A of FIG. 1. However, the process 400 is not limited to the electronic device 102 and/or the wireless transaction terminal 104A of FIG. 1, and one or more blocks (or operations) of the process 400 may be performed by one or more other components or chips of the electronic device 102 and/or of the wireless transaction terminal 104A. The electronic device 102 also is presented as an exemplary device and the operations described herein may be performed by any suitable device. Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The electronic device 102 receives, from a wireless transaction terminal 104A, a signal for conducting a wireless transaction (402). For example, the NFC controller 206 of the electronic device 102 may receive a signal, such as a polling signal, a read command, a write command, etc., from the wireless transaction terminal 104A. Example signals that are communicated in a wireless transaction are discussed further below with respect to FIG. 4. In one or more implementations, the signals associated with conducting a wireless transaction may be encrypted such that the content of the signals is inaccessible to the NFC controller 206, and therefore the NFC controller 206 may provide one or more of the received signals to the collocated secure element 208.

The NFC controller 206 determines whether to implement a signal strength threshold for the wireless transaction (406). In one or more implementations, the NFC controller 206 may determine, from a signal received from the wireless transaction terminal 104A without encryption (and/or without encryption that requires the secure element 208 for decryption), a transaction type associated with the signals received from the wireless transaction terminal 104A. For example, the NFC controller 206 may transmit a polling response signal in response to a polling signal received from the wireless transaction terminal 104A. The NFC controller 206 may then receive an unencrypted request service signal from which a transaction type can be determined. An example process flow corresponding to determining whether to implement the signal strength threshold based on signals received without encryption is discussed further below with respect to FIG. 5, and an example timing diagram of the same is discussed further below with respect to FIG. 8.

In one or more implementations, when the NFC controller 206 cannot access the content of the signals, the NFC controller 206 may forward one or more of the received signals to the secure element 208, and the NFC controller 206 may receive an indication of whether a signal strength threshold should be implemented, and/or other information, from the secure element 208. For example, the secure element 208 may decrypt the signals associated with the wireless transaction and may provide a transaction type indicator, and/or other information associated with the wireless transaction, to the NFC controller 206. Example process flows corresponding to determining whether to implement the signal strength threshold based on information received from the secure element 208 are discussed further below with respect to FIGS. 6 and 7, and an example timing diagram of the same is discussed further below with respect to FIG. 9.

The NFC controller 206 may determine, based on the transaction type, whether a signal strength threshold should be implemented for the wireless transaction. For example, the NFC controller 206 may access a table, such as a table stored in the memory 204, to determine whether a signal strength threshold should be implemented for a given transaction type, and, if so, what value the signal strength threshold should be set to. The value that the signal strength should be set to may be pre-stored in the memory 204, and may be based on, for example, the minimum signal strength associated with passive devices that communicate with the wireless transaction terminal 104A, the distance between the wireless transaction terminal 104A and another proximate wireless transaction terminal 104B, etc.

If the NFC controller 206 determines that the signal strength threshold should not be implemented for the wireless transaction (408), the NFC controller 206 allows the wireless transaction to complete (414), such as by responding to one or more authorization commands from the wireless transaction terminal 104A, forwarding a write command from the wireless transaction terminal 104A to the secure element 208, and/or forwarding a write response from the secure element 208 to the wireless transaction terminal 104A. If the NFC controller 206 determines that a signal strength threshold should be implemented for the wireless transaction (408), the NFC controller 206 measures the current signal strength, or field strength, associated with the wireless transaction (410). The signal strength measurement may be based on, for example, a received signal strength indication (RSSI) value. In one or more implementations, other metrics that are indicative of signal strength may be used.

After measuring the current signal strength (410), the NFC controller 206 determines whether the measured signal strength satisfies the signal strength threshold implemented for the wireless transaction (412). If the measured signal strength satisfies the signal strength threshold implemented for the wireless transaction (412), the NFC controller 414 allows the wireless transaction to complete (414), such as by responding to one or more authorization commands from the wireless transaction terminal 104A, forwarding a write command from the wireless transaction terminal 104A to the secure element 208, and/or forwarding a write response from the secure element 208 to the wireless transaction terminal 104A.

If the measured signal strength does not satisfy the signal strength threshold implemented for the wireless transaction (412), the NFC controller 206 prevents the wireless transaction from completing (416), such as by not responding to one or more authorization commands from the wireless transaction terminal 104A, dropping a write command from the wireless transaction terminal 104A and/or dropping a write response from the secure element 208. In this manner, when the signal strength threshold is implemented by the electronic device 102, the electronic device 102 only completes wireless transactions with the wireless transaction terminal 104A that would be in range of a passive device, and the electronic device 102 does not complete wireless transactions with the wireless transaction terminal 104B that would be out of range of the passive device.

Figure 5:
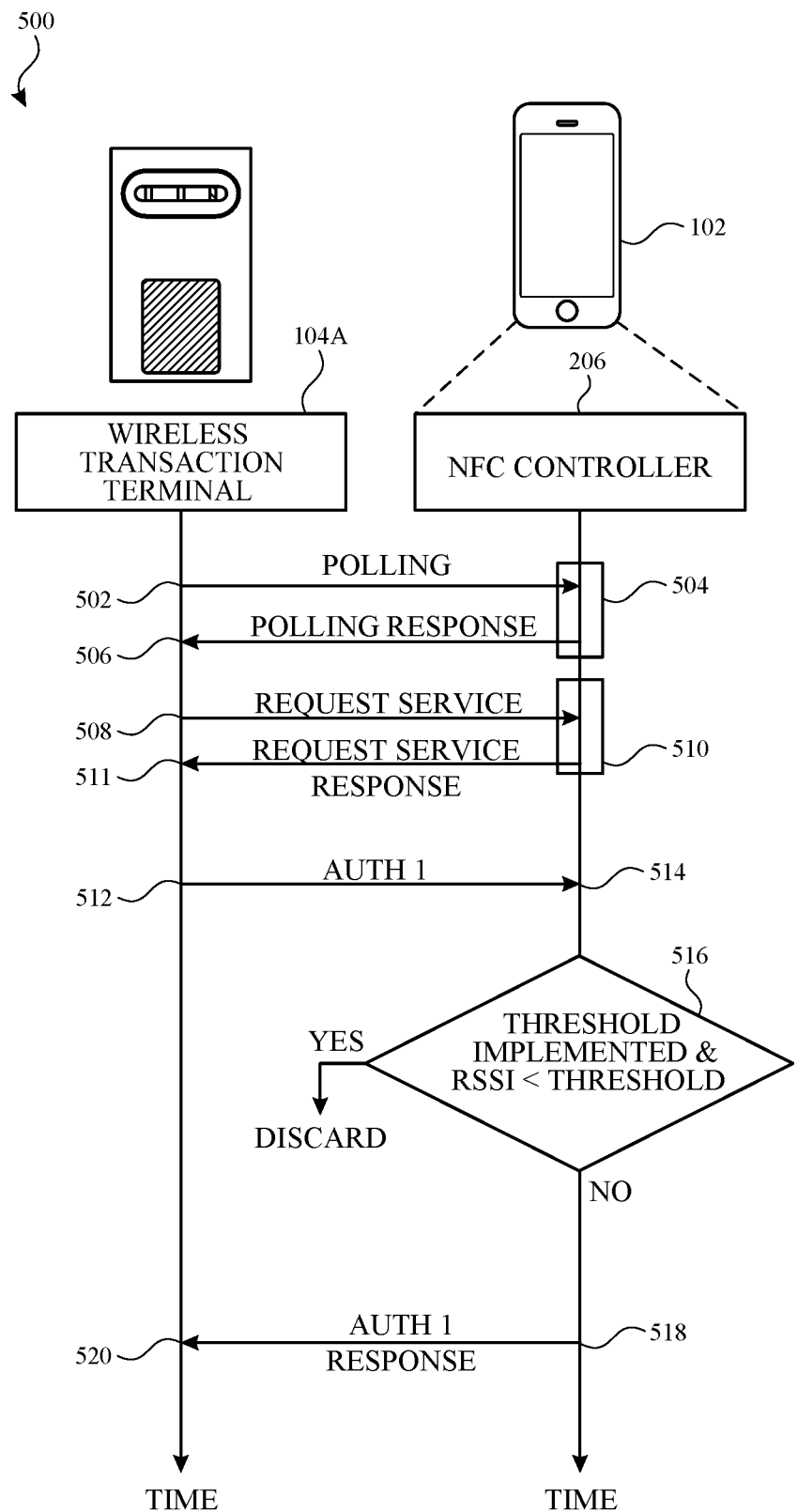
FIG. 5 illustrates an example process flow in a system for preventing duplicate wireless transactions in accordance with one or more implementations.

FIG. 5 illustrates an example process flow 500 in a system for preventing duplicate wireless transactions in accordance with one or more implementations. For explanatory purposes, the process flow 500 is primarily described herein with reference to the NFC controller 206 of the electronic device 102 of FIGS. 2-3. However, the process flow 500 is not limited to the NFC controller 206 of the electronic device 102 of FIGS. 2-3, and one or more blocks (or operations) of the process flow 500 may be performed by one or more other components or chips of the electronic device 102. The electronic device 102 also is presented as an exemplary device and the operations described herein may be performed by any suitable device. Further for explanatory purposes, the blocks of the process flow 500 are described herein as occurring in serial, or linearly. However, multiple blocks of the process flow 500 may occur in parallel. In addition, the blocks of the process flow 500 need not be performed in the order shown and/or one or more blocks of the process flow 500 need not be performed and/or can be replaced by other operations.

The process flow 500 begins with the wireless transaction terminal 104A transmitting a polling signal to the NFC controller 206 (502). The NFC controller 206 receives the polling signal and responds by transmitting a polling response (504). The wireless transaction terminal 104A receives the polling response (506) and subsequently transmits a request service command to the NFC controller 206 (508). The NFC controller 206 receives the request service command and transmits a request service response (510).

The NFC controller 206 determines, from the request service command, a transaction type corresponding to the signals received from the wireless transaction terminal 104A. For example, the request service command may be unencrypted and may include one or more fields/attributes from which the transaction type may be determinable. The NFC controller 206 may determine, based at least in part on the determined transaction type, whether a signal strength threshold should be implemented for the wireless transaction and, if so, what signal strength value the signal strength threshold should be set to. The transaction type may be indicative of, in one or more implementations, the wireless transaction terminal 104A, the service provider associated with the wireless transaction terminal 104A, a type of transaction being conducted with the wireless transaction terminal 104A, one or more hardware attributes regarding the wireless transaction terminal 104A, and/or generally any information regarding the wireless transaction and/or the wireless transaction terminal 104A. The NFC controller 206 may use the transaction type indicator, and/or information contained therein, to look up, such as in a data structure stored in the memory 204, whether a signal strength threshold should be implemented for the wireless transaction and/or a signal strength value to be used for the signal strength threshold. The NFC controller 206 may also determine an RSSI value (and/or another metric indicative of signal strength) from the received request service command.

The wireless transaction terminal 104A receives the request service response (511), and may subsequently transmit an authorization command to the NFC controller 206 (512). The NFC controller 206 may receive the authorization command (514) and the NFC controller 206 determines whether the signal strength threshold has been implemented for the wireless transaction and, if so, whether a current measured signal strength satisfies, e.g. exceeds, the signal strength threshold (516). If the signal strength threshold has been implemented and the current measured signal strength does not satisfy the signal strength threshold (516), the NFC controller 206 does not respond to the authorization command, and instead drops or discards the authorization command, thereby preventing the wireless transaction from completing. In one or more implementations, the wireless transaction terminal 104A may retransmit the authorization command a number of times, and the NFC controller 206 may repeatedly drop or discard the authorization command.

If the signal strength threshold has not been implemented for the wireless transaction and/or if the signal strength threshold has been implemented and the current measured signal strength satisfies the signal strength threshold, the NFC controller 206 responds to the authorization command by transmitting an authorization response (518), which is received by the wireless transaction terminal 104A (520), thereby allowing the wireless transaction to continue.

For explanatory purposes, the transaction type is described as being determinable by the NFC controller 206 without facilitation from the secure element 208. However, in one or more implementations, an indication of the transaction type may be transmitted by the secure element 208 to the NFC controller 206, as is discussed further below with respect to FIGS. 6 and 7.

Figure 6:
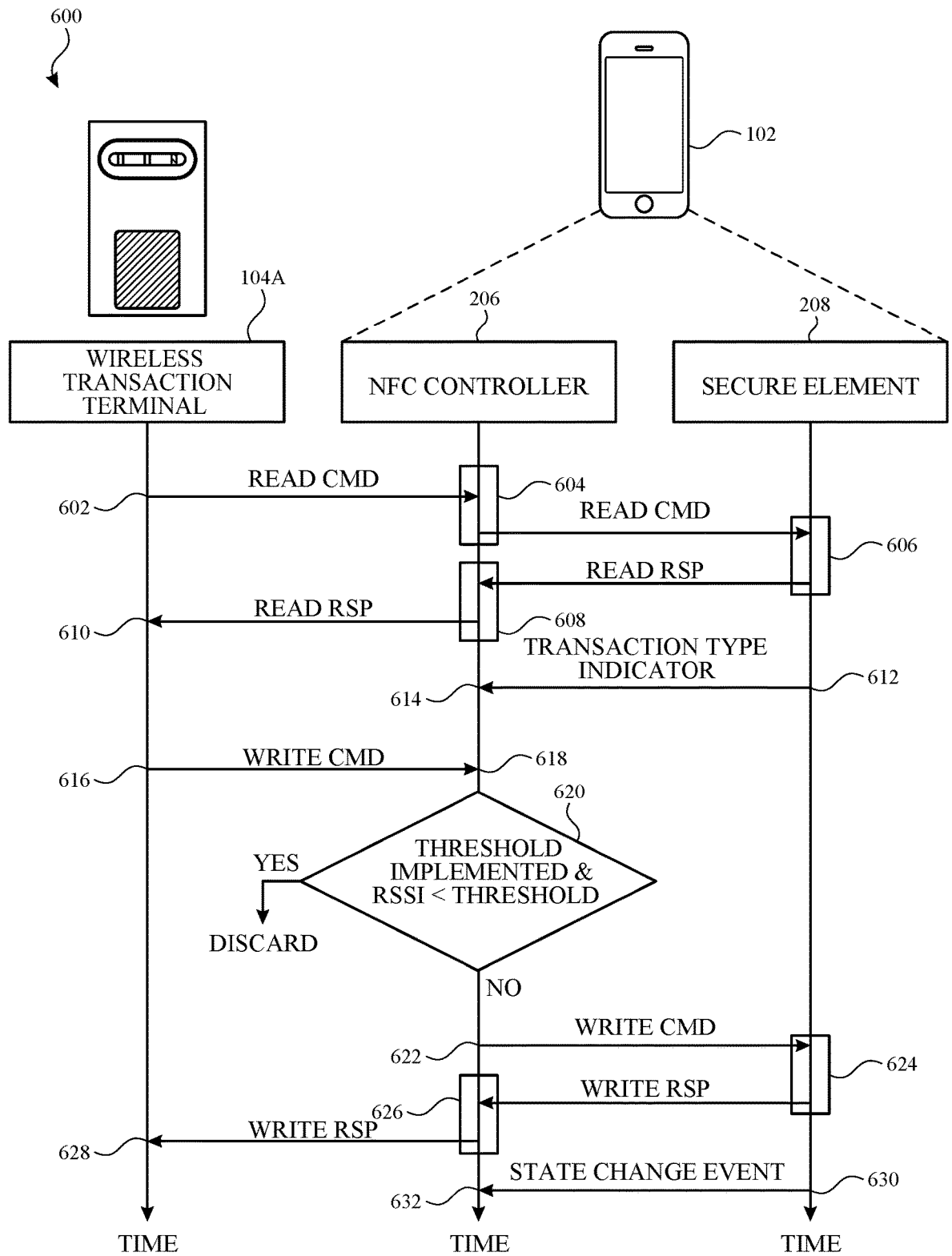
FIG. 6 illustrates an example process flow in a system for preventing duplicate wireless transactions in accordance with one or more implementations.

FIG. 6 illustrates an example process flow 600 in a system for preventing duplicate wireless transactions in accordance with one or more implementations. For explanatory purposes, the process flow 600 is primarily described herein with reference to the NFC controller 206 and the secure element 208 of the electronic device 102 of FIGS. 2-3. However, the process flow 600 is not limited to the NFC controller 206 or the secure element 208 of the electronic device 102 of FIGS. 2-3, and one or more blocks (or operations) of the process flow 600 may be performed by one or more other components or chips of the electronic device 102 and/or of the secure element 208. The electronic device 102 also is presented as an exemplary device and the operations described herein may be performed by any suitable device. Further for explanatory purposes, the blocks of the process flow 600 are described herein as occurring in serial, or linearly. However, multiple blocks of the process flow 600 may occur in parallel. In addition, the blocks of the process flow 600 need not be performed in the order shown and/or one or more blocks of the process flow 600 need not be performed and/or can be replaced by other operations.

The process flow 600 begins with the wireless transaction terminal 104A transmitting a read command for a wireless transaction to the NFC controller 206 (602). The NFC controller 206 receives the read command and forwards the read command to the secure element 208 (604). The read command may be a request for the secure element 208 to provide an indication of whether it contains an applet for communicating with the wireless transaction terminal 104A and, if so, to provide one or more attributes stored in the applet, such as the amount of value stored in the applet. In one or more implementations, one or more signals or messages may have been exchanged between the wireless transaction terminal 104A and the secure element 208 (via the NFC controller 206) prior to the start of the process flow 600, such as polling signals, authentication messages, and the like.

The secure element 208 receives the read command, queries the applet associated with the wireless transaction terminal 104A, and transmits the query response to the NFC controller 206 (606). The NFC controller 206 receives the read response from the secure element 208 and forwards the read response to the wireless transaction terminal 104A (608). The wireless transaction terminal 104A receives the read response and determines whether the secure element 208 contains the appropriate applet with sufficient stored value for completing the wireless transaction (610).

After transmitting the read response (606), the secure element 208 determines a transaction type for the wireless transaction and transmits a transaction type indicator to the NFC controller 206 (612). The NFC controller 206 receives the transaction type indicator (614) and determines, based at least in part on the transaction type indicator, whether a signal strength threshold should be implemented for the wireless transaction and, if so, what signal strength value the signal strength threshold should be set to. For example, the transaction type indicator may identify, in one or more implementations, the wireless transaction terminal 104A, the service provider associated with the wireless transaction terminal 104A, a type of transaction being conducted with the wireless transaction terminal 104A, one or more hardware attributes regarding the wireless transaction terminal 104A, and/or generally any information regarding the wireless transaction and/or the wireless transaction terminal 104A. The NFC controller 206 may use the transaction type indicator, and/or information contained therein, to look up, such as in a data structure stored in the memory 204, whether a signal strength threshold should be implemented for the wireless transaction and/or a signal strength value to be used for the signal strength threshold.

In one or more implementations, the transaction type indicator may indicate whether the signal strength threshold should be implemented for the wireless transaction and/or the transaction type indicator may provide a signal strength value to be used by the NFC controller 206 for the signal strength threshold. For example, the service provider operating the wireless transaction terminal 104A may provision the applet on the secure element 208 with an attribute indicating whether the signal strength threshold should be implemented for the transaction type and/or an attribute indicating a value for the signal strength threshold for the transaction type. The service provider operating the wireless transaction terminal 104A may be aware of the configuration of the wireless transaction terminals 104A-B as well as a minimum signal strength required for communicating with passive devices associated with the service provider. In one or more implementations, when the transaction type indicator indicates that the signal strength threshold should be implemented for the wireless transaction, the NFC controller 206 sets a flag indicating that the signal strength threshold should be implemented for the wireless transaction.

If the wireless transaction terminal 104A determines that the secure element 208 contains the appropriate applet and sufficient stored value to complete the wireless transaction, the wireless transaction terminal 104A transmits a write command for completing the wireless transaction to the NFC controller 206 (616). The NFC controller 206 receives the write command (618) and the NFC controller 206 determines whether the signal strength threshold has been implemented for the wireless transaction and, if so, whether a current measured signal strength satisfies, e.g. exceeds, the signal strength threshold (620). If the signal strength threshold has been implemented and the current measured signal strength does not satisfy the signal strength threshold (620), the NFC controller 206 does not forward the write command to the secure element 208, and instead drops or discards the write command, thereby preventing the wireless transaction from completing and effectively causing the transaction to rollback.

If the signal strength threshold has not been implemented for the wireless transaction and/or if the signal strength threshold has been implemented and the current measured signal strength satisfies the signal strength threshold, the NFC controller 206 forwards the write command to the secure element 208 (622), thereby allowing the wireless transaction to continue. In one or more implementations, both the read commands/responses and the write commands/responses may be encrypted such that the NFC controller 206 is unable to identify a transaction type of the wireless transaction, or other information regarding the wireless transaction, from the commands/responses.

The secure element 208 receives and executes the write command, which may, for example, cause the applet associated with the wireless transaction terminal 104A to deduct value stored in the applet, and, upon completing the write command, transmits a write response to the NFC controller 206 (624). The NFC controller 206 receives the write response from the secure element 208 and forwards the write response to the wireless transaction terminal 104A (626).

The wireless transaction terminal 104A receives the write response and completes the wireless transaction (628). In one or more implementations, the secure element may transmit a state change event (630) to the NFC controller 206. The state change event may indicate, when received by the NFC controller 206 (632), that the wireless transaction has been performed.

For explanatory purposes, the transaction type indicator is illustrated as being transmitted by the secure element 208 to the NFC controller 206 after receiving the read command and transmitting a read response (606). However, in one or more implementations, the transaction type indicator may be transmitted by the secure element 208 to the NFC controller 206 responsive to the secure element 208 receiving the read command, or responsive to the secure element 208 receiving the write command (624), as is discussed further below with respect to FIG. 7.

Figure 7:
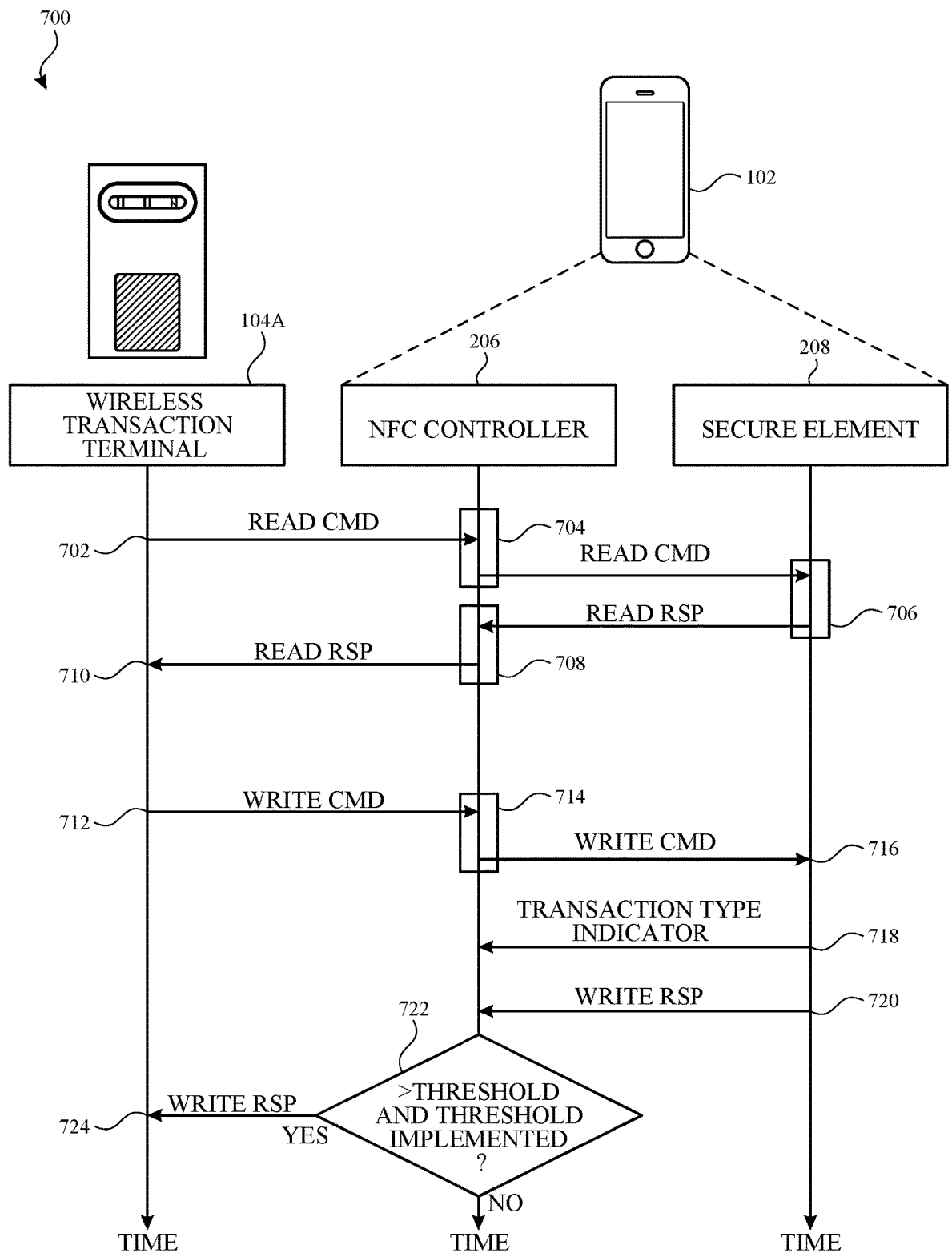
FIG. 7 illustrates an example process flow in a system for preventing duplicate wireless transactions in accordance with one or more implementations.

FIG. 7 illustrates an example process flow 700 in a system for preventing duplicate wireless transactions in accordance with one or more implementations. For explanatory purposes, the process flow 700 is primarily described herein with reference to the NFC controller 206 and the secure element 208 of the electronic device 102 of FIGS. 2-3. However, the process flow 700 is not limited to the NFC controller 206 or the secure element 208 of the electronic device 102 of FIGS. 2-3, and one or more blocks (or operations) of the process flow 700 may be performed by one or more other components or chips of the electronic device 102 and/or of the secure element 208. The electronic device 102 also is presented as an exemplary device and the operations described herein may be performed by any suitable device. Further for explanatory purposes, the blocks of the process flow 700 are described herein as occurring in serial, or linearly. However, multiple blocks of the process flow 700 may occur in parallel. In addition, the blocks of the process flow 700 need not be performed in the order shown and/or one or more blocks of the process flow 700 need not be performed and/or can be replaced by other operations.

The process flow 700 begins with the wireless transaction terminal 104A transmitting a read command for a wireless transaction to the NFC controller 206 (702). The NFC controller 206 receives the read command and forwards the read command to the secure element 208 (704). The read command may be a request for the secure element 208 to provide an indication of whether it contains an applet for communicating with the wireless transaction terminal 104A and, if so, to provide one or more attributes stored in the applet, such as the amount of value stored in the applet. In one or more implementations, one or more signals or messages may have been exchanged between the wireless transaction terminal 104A and the secure element 208 prior to the start of the process flow 700, such as polling signals, authentication messages, and the like.

The secure element 208 receives the read command, queries the applet associated with the wireless transaction terminal 104A, and transmits the query response to the NFC controller 206 (706). The NFC controller 206 receives the read response from the secure element 208 and forwards the read response to the wireless transaction terminal 104A (708). The wireless transaction terminal 104A receives the read response and determines whether the secure element 208 contains the appropriate applet with sufficient stored value for completing the wireless transaction (710).

If the wireless transaction terminal 104A determines that the secure element 208 contains the appropriate applet and sufficient stored value to complete the wireless transaction, the wireless transaction terminal 104A transmits a write command for completing the wireless transaction to the NFC controller 206 (712). The NFC controller 206 receives the write command and forwards the write command to the secure element 208 (714). In one or more implementations, both the read commands/responses and the write commands/responses may be encrypted such that the NFC controller 206 is unable to identify a transaction type of the wireless transaction from the commands/responses.

The secure element 208 receives the write command (716) and transmits a transaction type indicator to the NFC controller 206 (718). The NFC controller 206 may use the transaction type indicator, and/or information contained therein, to determine whether a signal strength threshold should be implemented for the wireless transaction and/or to determine a signal strength value to be used for the signal strength threshold.

The secure element 208 executes the write command, which may, for example, cause the applet associated with the wireless transaction terminal 104A to deduct value stored in the applet. Upon completing the write command the secure element 208 transmits a write response to the NFC controller 206 (720). Upon receiving the write response, the NFC controller 206 determines whether the signal strength threshold has been implemented for the wireless transaction and, if so, whether a current measured signal strength satisfies, e.g. exceeds, the signal strength threshold (722). If the signal strength threshold has been implemented and the current measured signal strength does not satisfy the signal strength threshold (722), the NFC controller 206 does not transmit the write response to the wireless transaction terminal 104A, and instead drops the write response, thereby preventing the wireless transaction from completing and effectively causing the transaction to rollback.

If the signal strength threshold has not been implemented for the wireless transaction and/or if the signal strength threshold has been implemented and the current measured signal strength satisfies the signal strength threshold, the NFC controller 206 forwards the write response to the wireless transaction terminal 104A (722), thereby allowing the wireless transaction to complete. The wireless transaction terminal 104A receives the write response and completes the wireless transaction (724).

Figure 8:
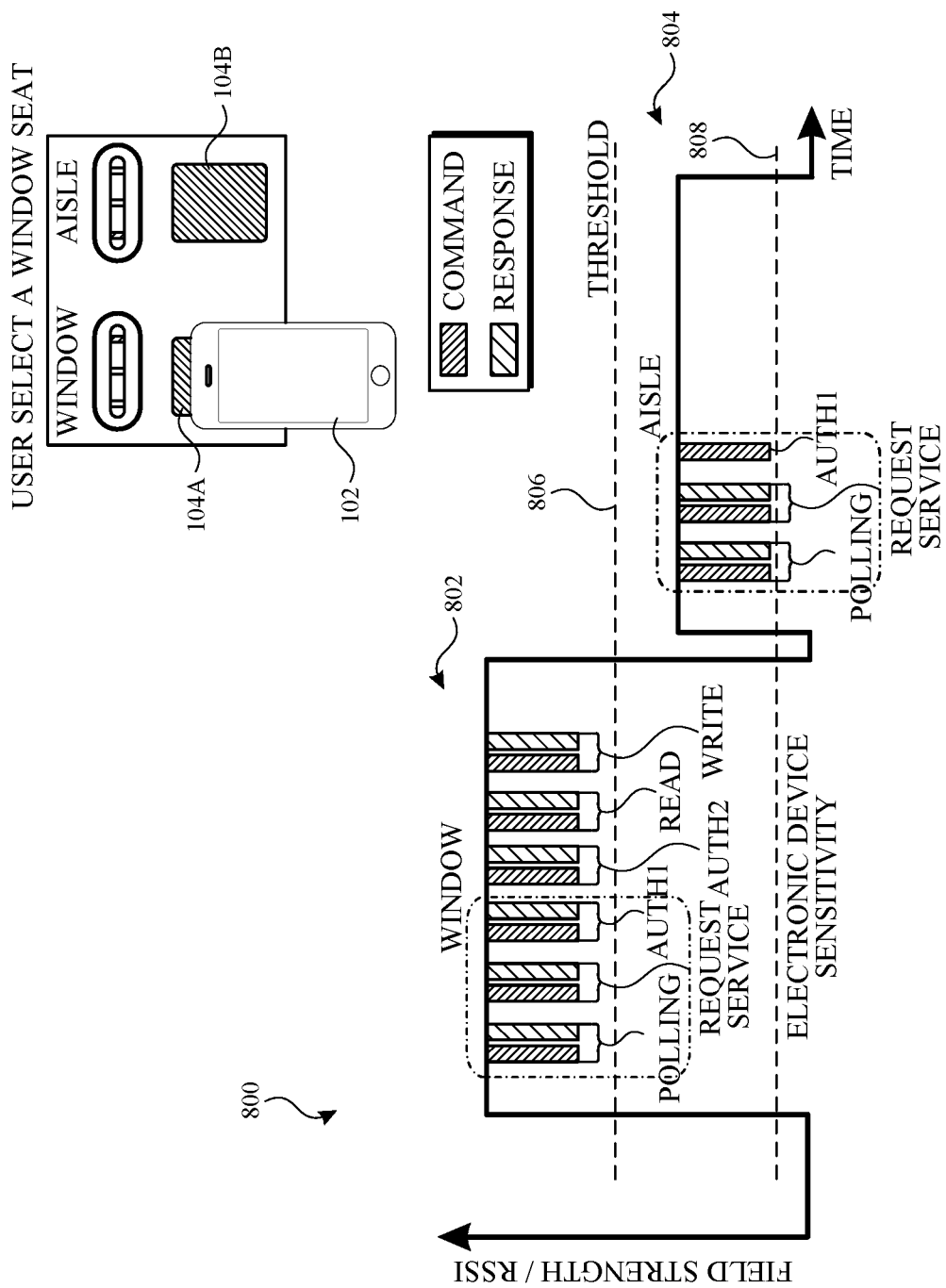
FIG. 8 illustrates an example signal timing diagram in accordance with one or more implementations.

FIG. 8 illustrates an example signal timing diagram 800 in accordance with one or more implementations. In the signal timing diagram 800, the electronic device 102 (implementing the subject system) is placed proximate to the wireless transaction terminal 104A that is associated with a window seat in a transit vehicle, such as a train, a bus, an airplane, or the like. However, since the wireless transaction terminal 104A is located proximate to the wireless transaction terminal 104B that is associated with an aisle seat in the transit vehicle, the electronic device 102 receives signals from both of the wireless transaction terminals 104A-B.

The signal timing diagram 800 includes a window timing diagram 802 which represents the signals transmitted between the electronic device 102 and the window wireless transaction terminal 104A, and an aisle timing diagram 804 which represents the signals transmitted between the electronic device 102 and the aisle wireless transaction terminal 104B. The signal timing diagram 800 also includes a signal (or field) strength threshold value 806 which represents the minimum signal or field strength for which a passive device can communicate with the wireless transaction terminals 104A-B, and an electronic device sensitivity threshold 808, which indicates the minimum signal or field strength at which the electronic device 102 can communicate with the wireless transaction terminals 104A-B. Accordingly, NFC controller 206 may set the signal strength threshold for wireless transactions with the wireless transaction terminals 104A-B to the signal strength threshold value 806 at which a passive device can communicate with the wireless transaction terminals 104A-B.

As shown in the signal timing diagram 800, the signals communicated between the electronic device 102 and the window wireless transaction terminal 104A exceed the signal strength threshold value 806; however, the signals communicated between the electronic device 102 and the aisle wireless transaction terminal 104B do not exceed the signal strength threshold value 806. Accordingly, as shown in the window timing diagram 802, the last write response is transmitted from the electronic device 102 to the wireless transaction terminal 104A, thereby completing the wireless transaction with the wireless transaction terminal 104A. However, as shown in the aisle timing diagram 804, the NFC controller 206 determines the transaction type and signal strength from the received request service command and, because the signal strength threshold value 806 is not satisfied, the NFC controller 206 does not respond to the authorization command (AUTH1), thereby preventing the (duplicate) wireless transaction with the wireless transaction terminal 104B from completing.

Figure 9:
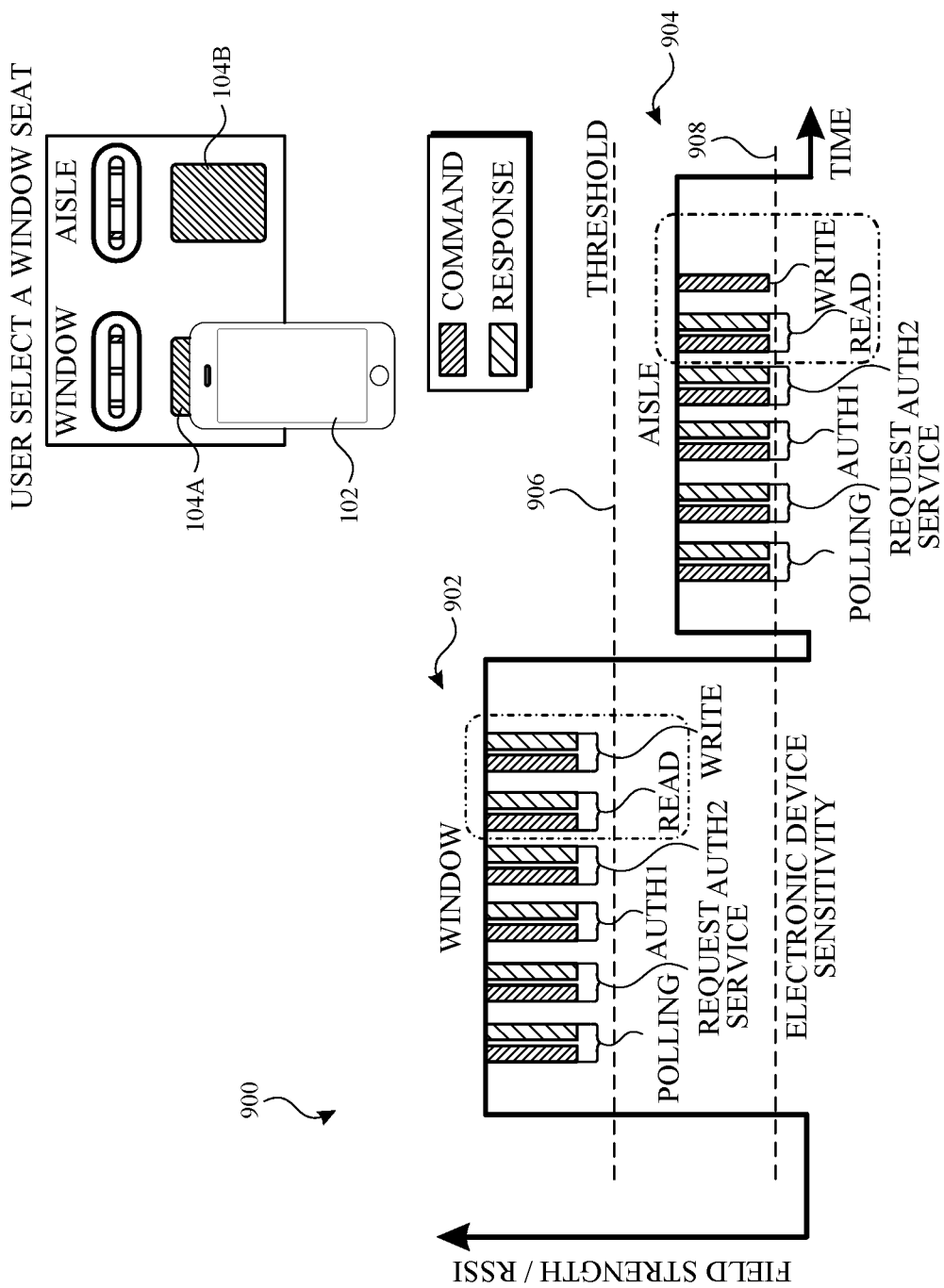
FIG. 9 illustrates an example signal timing diagram in accordance with one or more implementations.

FIG. 9 illustrates an example signal timing diagram 900 in accordance with one or more implementations. In the signal timing diagram 900, the electronic device 102 (implementing the subject system) is placed proximate to the wireless transaction terminal 104A that is associated with a window seat in a transit vehicle, such as a train, a bus, an airplane, or the like. However, since the wireless transaction terminal 104A is located proximate to the wireless transaction terminal 104B that is associated with an aisle seat in the transit vehicle, the electronic device 102 receives signals from both of the wireless transaction terminals 104A-B.

The signal timing diagram 900 includes a window timing diagram 902 which represents the signals transmitted between the electronic device 102 and the window wireless transaction terminal 104A, and an aisle timing diagram 904 which represents the signals transmitted between the electronic device 102 and the aisle wireless transaction terminal 104B. The signal timing diagram 900 also includes a signal (or field) strength threshold value 906 which represents the minimum signal or field strength for which a passive device can communicate with the wireless transaction terminals 104A-B, and an electronic device sensitivity threshold 908, which indicates the minimum signal or field strength at which the electronic device 102 can communicate with the wireless transaction terminals 104A-B. Accordingly, NFC controller 206 may set the signal strength threshold for wireless transactions with the wireless transaction terminals 104A-B to the signal strength threshold value 906 at which a passive device can communicate with the wireless transaction terminals 104A-B.

As shown in the signal timing diagram 900, the signals communicated between the electronic device 102 and the window wireless transaction terminal 104A exceed the signal strength threshold value 906; however, the signals communicated between the electronic device 102 and the aisle wireless transaction terminal 104B do not exceed the signal strength threshold value 906. Accordingly, as shown in the window timing diagram 902, the last write response is transmitted from the electronic device 102 to the wireless transaction terminal 104A, thereby completing the wireless transaction with the wireless transaction terminal 104A. However, as shown in the aisle timing diagram 904, the last write command and/or the last write response is dropped by the NFC controller 206 (because the signal strength threshold value 906 is not satisfied) and not transmitted from the electronic device 102 to the wireless transaction terminal 104B, thereby preventing the (duplicate) wireless transaction with the wireless transaction terminal 104B from completing.

Figure 10:
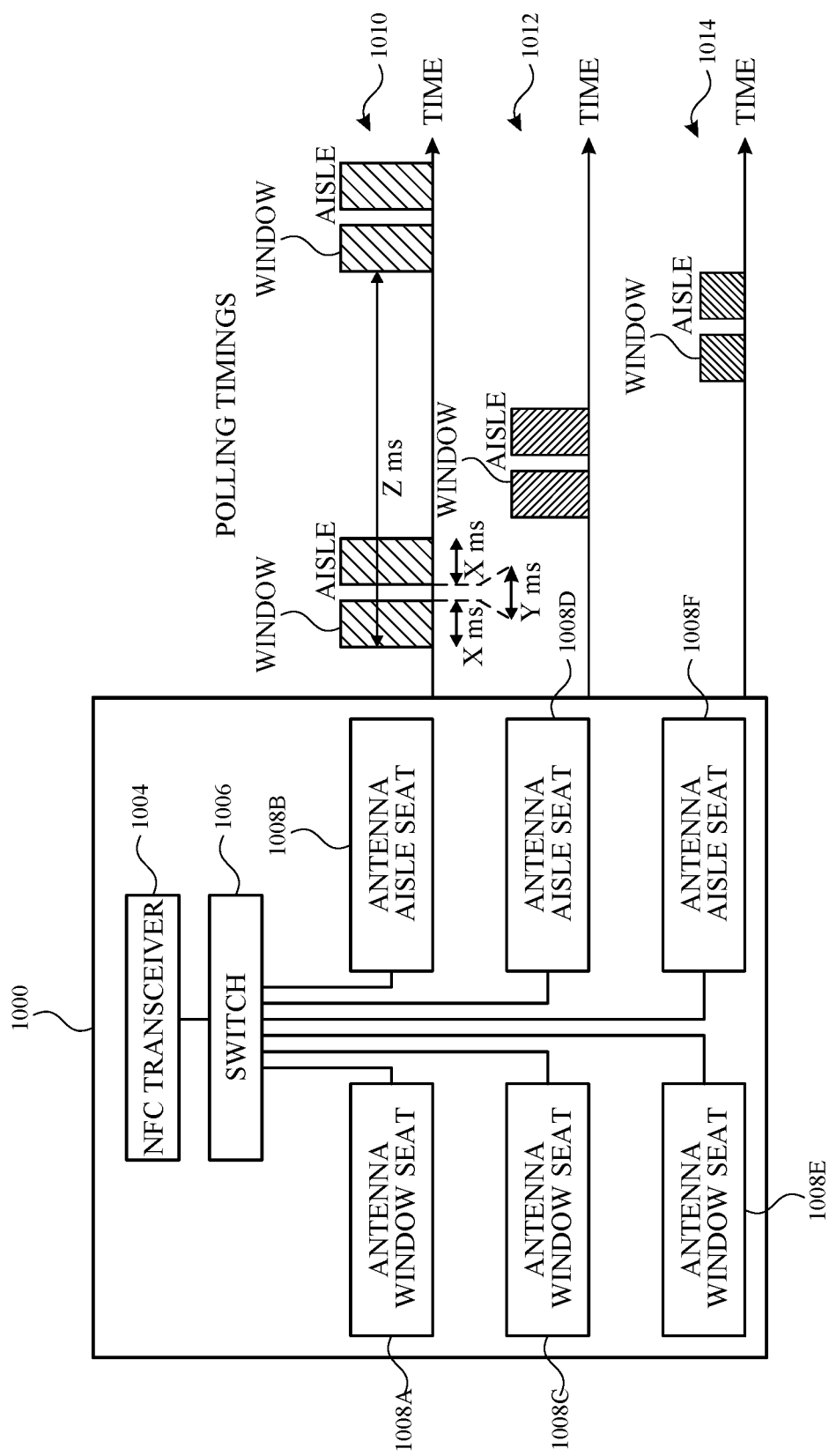
FIG. 10 illustrates an example distributed wireless transaction terminal that may be used in a system for preventing duplicate wireless transactions in accordance with one or more implementations.

FIG. 10 illustrates an example distributed wireless transaction terminal 1000 that may be used in a system for preventing duplicate wireless transactions in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The distributed wireless transaction terminal 1000 may include an NFC transceiver 1004, a switch 1006 and multiple individual antennas 1008A-F. The antennas 1008A-F may be spatially distributed, such as in a transit vehicle. For example, each of the antennas 1008A-F may be associated with a particular seat (e.g. aisle or window) on a transit vehicle. Since the antennas 1008A-F share the single NFC transceiver 1004, the polling signals transmitted by the antennas 1008A-F may be temporally separated. For example, as shown in the polling timing diagram 1010, the antennas 1008A-B may first transmit polling signals. Then, as shown in the polling timing diagram 1012, the antennas 1008C-D may transmit polling signals. Lastly, as shown in the timing diagram 1014, the antennas 1008E-F may transmit polling signals, and then the pattern repeats again starting with the antennas 1008A-B.

Figure 11:
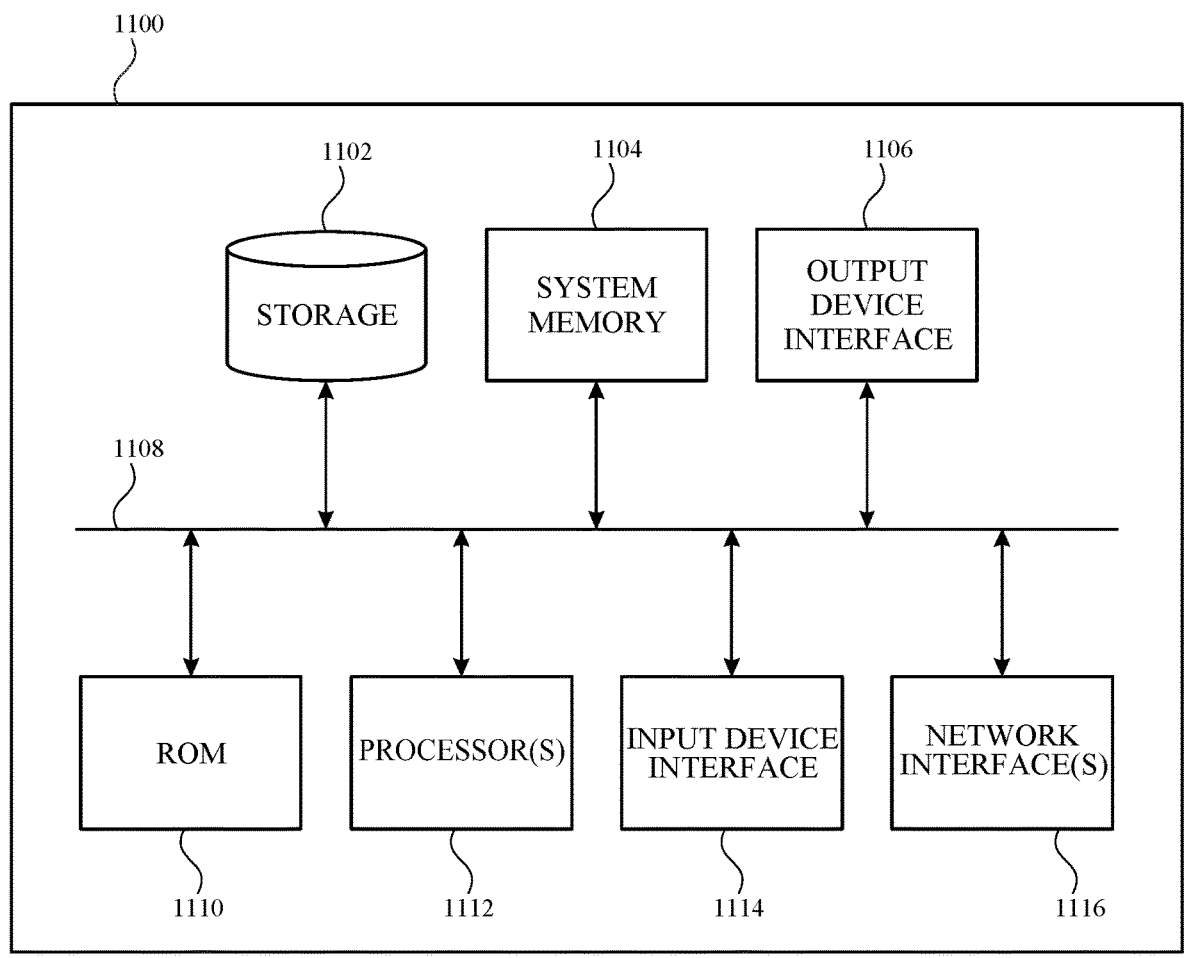
FIG. 11 conceptually illustrates an electronic system with which aspects of the subject technology may be implemented in accordance with one or more implementations.

FIG. 11 conceptually illustrates an electronic system 1100 with which one or more implementations of the subject technology may be implemented. The electronic system 1100 can be, and/or can be a part of, the electronic device 102, one or more of the wireless transaction terminals 104A-B, and/or one or more of the servers 110, 120 shown in FIG. 1. The electronic system 1100 may include various types of computer readable media and interfaces for various other types of computer readable media. The electronic system 1100 includes a bus 1108, one or more processing unit(s) 1112, a system memory 1104 (and/or buffer), a ROM 1110, a permanent storage device 1102, an input device interface 1114, an output device interface 1106, and one or more network interfaces 1116, or subsets and variations thereof.

The bus 1108 collectively represents all system, peripheral, and chipset buses that communicatively connect the numerous internal devices of the electronic system 1100. In one or more implementations, the bus 1108 communicatively connects the one or more processing unit(s) 1112 with the ROM 1110, the system memory 1104, and the permanent storage device 1102. From these various memory units, the one or more processing unit(s) 1112 retrieves instructions to execute and data to process in order to execute the processes of the subject disclosure. The one or more processing unit(s) 1112 can be a single processor or a multi-core processor in different implementations.

The ROM 1110 stores static data and instructions that are needed by the one or more processing unit(s) 1112 and other modules of the electronic system 1100. The permanent storage device 1102, on the other hand, may be a read-and-write memory device. The permanent storage device 1102 may be a non-volatile memory unit that stores instructions and data even when the electronic system 1100 is off. In one or more implementations, a mass-storage device (such as a magnetic or optical disk and its corresponding disk drive) may be used as the permanent storage device 1102.

In one or more implementations, a removable storage device (such as a floppy disk, flash drive, and its corresponding disk drive) may be used as the permanent storage device 1102. Like the permanent storage device 1102, the system memory 1104 may be a read-and-write memory device. However, unlike the permanent storage device 1102, the system memory 1104 may be a volatile read-and-write memory, such as random access memory. The system memory 1104 may store any of the instructions and data that one or more processing unit(s) 1112 may need at runtime. In one or more implementations, the processes of the subject disclosure are stored in the system memory 1104, the permanent storage device 1102, and/or the ROM 1110. From these various memory units, the one or more processing unit(s) 1112 retrieves instructions to execute and data to process in order to execute the processes of one or more implementations.

The bus 1108 also connects to the input and output device interfaces 1114 and 1106. The input device interface 1114 enables a user to communicate information and select commands to the electronic system 1100. Input devices that may be used with the input device interface 1114 may include, for example, alphanumeric keyboards and pointing devices (also called "cursor control devices"). The output device interface 1106 may enable, for example, the display of images generated by electronic system 1100. Output devices that may be used with the output device interface 1106 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 11, the bus 1108 also couples the electronic system 1100 to one or more networks and/or to one or more network nodes through the one or more network interface(s) 1116. In this manner, the electronic system 1100 can be a part of a network of computers (such as a LAN, a wide area network ("WAN"), or an Intranet, or a network of networks, such as the Internet. Any or all components of the electronic system 1100 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   receiving, by a wireless communication controller of an electronic device and from a wireless transaction terminal, a data item associated with a wireless transaction;
   determining, by the wireless communication controller, a transaction type of the wireless transaction based at least in part on a signal received from the wireless transaction terminal, the signal being indicative of the transaction type;
   implementing, by the wireless communication controller, a signal strength threshold for the wireless transaction when the determined transaction type comprises a first transaction type, and forego implementing the signal strength threshold for the wireless transaction when the determined transaction type comprises a second transaction type that differs from the first transaction type;
   measuring, by the wireless communication controller, a current signal strength with respect to the wireless transaction terminal when the signal strength threshold is implemented for the wireless transaction;
   dropping, by the wireless communication controller, the data item when the signal strength threshold is implemented for the wireless transaction and the current signal strength does not satisfy the signal strength threshold in order to prevent the wireless transaction from completing with multiple proximate wireless transaction terminals associated with a same service provider for the transaction type; and
   responding to the wireless transaction terminal with respect to the received data item when the signal threshold is implemented and the current signal strength satisfies the signal strength threshold, or when the signal strength threshold is not implemented.

2. The method of claim 1, wherein the data item comprises an authorization command.

3. The method of claim 1, wherein the signal received from the wireless transaction terminal is received prior to receiving the data item.

4. A system comprising:
   at least one processor;
   a secure element configured to store a payment applet associated with a service provider; and
   a wireless communication controller communicatively coupled to the secure element, the wireless communication controller configured to:

communicate signals between a wireless transaction terminal of the service provider and the secure element, the signals being associated with a wireless transaction;

determine to implement a signal strength threshold for the wireless transaction when a transaction type of the wireless transaction comprises a first transaction type, and to forgo implementation of the signal strength threshold when the transaction type comprises a second transaction type that differs from the first transaction type;

measure a signal strength of one of the signals received from the wireless transaction terminal responsive to a determination to implement the signal strength threshold; and terminate the wireless transaction when the signal strength threshold is implemented and the measured signal strength does not satisfy the signal strength threshold in order to prevent the wireless transaction from completing with multiple proximate wireless transaction terminals associated with a same service provider for the transaction type.

5. The system of claim 4, wherein the wireless communication controller is further configured to:
receive, from the secure element, the signal strength threshold.

6. The system of claim 4, wherein the first and second transaction types are supported by the payment applet.

7. The system of claim 4, wherein the secure element is further configured to store an other payment applet associated with an other service provider and the wireless communication controller is further configured to implement an other signal strength threshold for a third transaction type supported by the other payment applet.

8. The system of claim 4, wherein the wireless communication controller is further configured to terminate the wireless transaction by dropping at least one of the signals communicated between the wireless transaction terminal and the secure element.

9. The system of claim 4, wherein the wireless communication controller is configured to terminate the wireless transaction by dropping at least one of the signals associated with the wireless transaction.

10. A device comprising:
at least one processor; and
a wireless communication controller configured to:
  receive a signal for conducting a wireless transaction with a wireless transaction terminal;
  determine whether a transaction type of the wireless transaction is associated with a signal strength threshold, wherein a first transaction type is associated with the signal strength threshold and a second transaction type is not associated with the signal strength threshold;
  measure a signal strength associated with the wireless transaction upon determining that the transaction type of the wireless transaction is associated with the signal strength threshold;
  prevent the wireless transaction from completing when the transaction type of the wireless transaction is associated with the signal strength threshold and the measured signal strength fails to satisfy the signal strength threshold in order to prevent the wireless transaction from completing with multiple proximate wireless transaction terminals associated with a same service provider for the transaction type; and
  allow the wireless transaction to complete when the transaction type is associated with the signal strength threshold and the measured signal strength satisfies the signal strength threshold.

11. The device of claim 10, wherein the wireless communication controller is further configured to:
prevent the wireless transaction from completing by discarding a received authorization command.

12. The device of claim 11, wherein the wireless communication controller is further configured to:
allow the wireless transaction to complete by responding to the received authorization command.

13. The device of claim 10, wherein the received signal comprises a request service command.

14. The device of claim 13, wherein the wireless communication controller is further configured to:
determine the transaction type of the wireless transaction based at least in part on the request service command.

15. The device of claim 10, wherein the wireless communication controller is further configured to:
provide another received signal for conducting the wireless transaction to a collocated secure element to allow the wireless transaction to complete.

16. The device of claim 10, wherein the signal strength threshold is set based at least in part on a distance between the wireless transaction terminal and an other wireless transaction terminal associated with the transaction type that is proximate to the wireless transaction terminal, the wireless transaction terminal and the other wireless transaction terminal being associated with the same service provider.

17. The device of claim 10, wherein the signal strength threshold is set based at least in part on a minimum signal strength for communicating with a passive device associated with the wireless transaction terminal.

18. The device of claim 10, wherein the wireless transaction is associated with a wireless transaction system, a first transaction type of the wireless transaction system is associated with the signal strength threshold, and a second transaction type of the wireless transaction system is not associated with the signal strength threshold.

19. The device of claim 18, wherein a third transaction type of the wireless transaction system is associated with an other signal strength threshold that differs from the signal strength threshold.

20. The device of claim 10, wherein the wireless communication controller is further configured to:
allow the wireless transaction to complete when the transaction type is not associated with the signal strength threshold.

* * * * *